Figure 1:
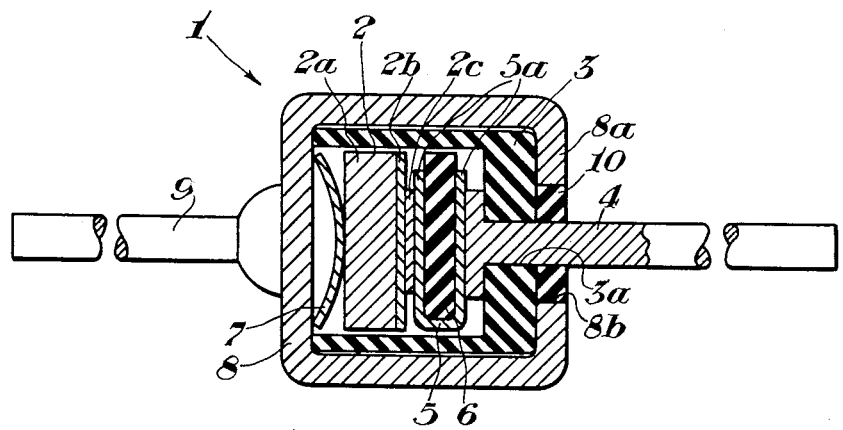

July 5, 1955  R. H. ZETWO  2,712,619
DRY DISK RECTIFIER ASSEMBLIES
Filed June 17, 1954

INVENTOR.
Regis H. Zetwo
BY
W. L. Stout.
HIS ATTORNEY

2,712,619

DRY DISK RECTIFIER ASSEMBLIES

Regis H. Zetwo, Swissvale, Pa., assignor to Westinghouse Air Brake Company, Wilmerding, Pa., a corporation of Pennsylvania Application June 17, 1954, Serial No. 437,389

8 Claims. (Cl. 317—234)

My present invention relates to dry disk rectifiers and particularly to the assembly of miniature dry disk rectifier cells.

In manufacturing and assembling small dry disk rectifier cells having diameters in the order of $\frac{1}{16}$ of an inch or less as used in miniature and subminiature electrical and electronic circuits, the smallness of the rectifier cells makes the handling and connecting such small cells into the electrical circuits quite difficult. One problem in connecting such small rectifier cells into electrical circuits is in obtaining a good electrical connection with the surfaces of the cells. Another problem in handling the small rectifier cells which is of prime import is the deterioration and possible destruction of the cell characteristics when these cells or cell assemblies are connected into the circuits. The rectifier cells or assemblies are usually connected in the same manner as other electrical elements are connected, that is, by soldering the elements to other circuit elements or wires. It has been found that in soldering rectifier assemblies into the circuits that the heat of the soldering operation is conducted through the lead-in wires of the assembly and adversely affects the rectifier characteristics of the cells. To overcome this problem of soldering the rectifier assemblies into the circuits, it has been the practice to provide long leads for the rectifier assemblies which would dissipate the heat of the soldering operation.

It is therefore an object of my invention to provide a small, compact rectifier assembly protected by a sealed housing against the deleterious effects of ambient conditions, the assembly comprising few and simple parts readily handled and assembled and wherein the need for potting compounds is entirely eliminated.

Another object of my invention is to provide resilient means for a dry disk rectifier assembly which engages the cell with considerable pressure to provide good electrical connections.

Still another object of my invention is to provide a rectifier assembly with folded contact members of considerable length, the length of short lead-in wires and the effective lengths of the contact members for the cells being of sufficient total length to dissipate the heat of soldering operations before the heat reaches the cell and adversely affects its characteristics.

A dry disk rectifier assembly in accordance with my invention is sealed within a metallic shell, the rectifier cell and the circuit connections thereto being enclosed in a heat and moisture-resistant plastic cup member. A metallic U-shaped contact member of considerable length and area is provided for the enclosed cell, a heat and moisture-resistant spacer of suitable dimensions being inserted between the arms of the contact member to prevent collapse of the member. Soldered or otherwise secured to one leg of the U-shaped contact member is a lead-in wire which passes out through a suitable opening provided in the bottom of the plastic cup member. The cell is placed within the cup, preferably with its counterelectrode surface abutting the second leg of the U-shaped contact member. A suitable contact spring is then placed in the cup member abutting the base of the rectifier cell. The plastic cup member is placed in the open end of the metallic shell with the open end of the plastic cup member toward the bottom of the shell. The open end of the shell is then spun over the plastic cup member seated on the bottom of the shell with the spring exerting a pressure against the base of the rectifier cell to provide the necessary contact pressure between the cell and the contact members. A short wire soldered or otherwise secured to the exterior of the tube, preferably at the bottom, serves as a terminal connector. A single drop of a suitable sealing compound seals the spun-over end of the shell to protect the assembled elements from deleterious ambient conditions.

These features of the dry disk rectifier assembly described are also characteristic of an assembly wherein two or more rectifier cells are enclosed in a metallic shell.

Other objects and characteristic features of my invention will appear as the specification progresses.

I shall describe two forms of assemblies embodying my invention, and shall then point out the novel features thereof in claims.

Figure 2:
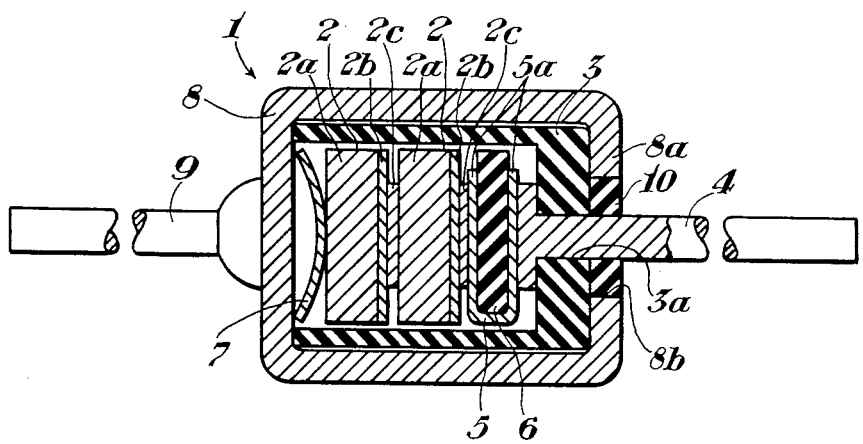

In the accompanying drawings:

Fig. 1 is a vertical section through a dry disk rectifier assembly embodying my invention; while Fig. 2 is a vertical section through a multicell dry disk rectifier assembly embodying the invention.

Similar reference characters refer to similar parts in each of the views.

Referring now in detail to Fig. 1 of the drawings, the reference character 1 designates a dry disk rectifier assembly embodying my invention. The assembly 1 comprises a small rectifier cell 2, which may be, by way of example, of the selenium type having a base plate 2a, a selenium layer 2b, and a counterelectrode layer 2c. The invention, however, is not necessarily limited to a cell or cells of the selenium type, a cell or cells of other types may be readily used in my novel assembly. The rectifier cell 2 is disposed within a cup or shell member 3 of suitable moisture and heat-resistant material, such as nylon. The cup member 3 is provided with an opening 3a in the bottom wall thereof, a lead-in wire 4 secured to a U-shaped contact member 5 disposed within the cup member passing out through the opening. The U-shaped contact member may be made, for example, from Phosphor bronze, the arms 5a of the member being of considerable heat dissipating areas. The arms 5a of the contact member are held in spaced relation by a spacer 6 of suitable insulating material inserted between the arms.

The contact member 5 and the spacer 6 are initially disposed within the bottom of the cup member 3, the lead-in wire 4 passing through the opening 3a with very little clearance. The rectifier cell 2 is then inserted with the counterelectrode layer 2c of the cell preferably abutting the inner arm of the U-shaped contact member 5. A bowed washer spring 7 is then disposed on the rectifier cell with the central portion thereof preferably abutting the base plate 2a of the rectifier cell. The cup member and its assembled parts are then inserted in a metal shell 8, a wire 9 serving as a terminal lead being soldered or otherwise secured to the exterior of the shell. With the cup member and assembled elements within the shell, the peripheral edge of the contact spring 7 abuts the bottom wall of the shell. The spring is biased or stressed when the open end of the shell 8 is spun over to form the sealing flange 8a over the bottom of the cup member 3. The bias of the spring 7 will exert sufficient pressure between all of the assembled elements to provide a good electrical connection with the cell elements. A single drop of a suitable sealing compound 10 placed in the opening 8b left by the spun-over flange 8a will seal the shell and protect the rectifier cell 2 against the deleterious effects of ambient conditions.

In Fig. 2 of the accompanying drawings, I have illustrated a multi-cell assembly wherein two rectifier cells 2 are disposed within the cup member 3, the counterelectrode layer of the one cell engaging the base plate of the second cell with suitable pressure due to the bias of the contact spring 7. It will be readily apparent that, although I have illustrated the multi-cell assembly of Fig. 2 as having two rectifier cells, any number of cells may be assembled in the manner illustrated and described.

The dry disk rectifier assembly embodying my invention may be readily soldered into any circuit, the U-shaped contact member of large area and effective length readily dissipating the heat of such operations before the assembled cell or cells are adversely affected by the heat. The contact spring also forms a heat dissipating surface of large area, the degree of heat dissipation being not as critical at the one end of the assembly adjacent the base plate as at the other end of the assembly adjacent the rectifying layer of the cell. The rectifier assembly hereindescribed has the further advantage of comprising few and simple parts which are readily handled and assembled, the need for the usual potting compounds used in such assemblies and the difficulties of handling such compounds having been entirely eliminated; a single drop of a suitable sealing compound being sufficient to seal the assembled cell or cells against moisture and dirt.

Although I have herein shown and described only two forms of dry disk rectifier assemblies embodying my invention, it is to be understood that various changes and modifications may be made therein within the scope of the appended claims without departing from the spirit and scope of my invention.

Having thus described my invention, what I claim is:

1. A rectifier assembly comprising, a cup member of insulating material having an opening in its bottom wall, a contact member of large heat dissipating area within the cup member, a lead-in wire secured to the contact member and passing through the opening in the cup member, a rectifier cell within the cup member having an electrode engaging the contact member, a resilient contact of considerable area in said cup member and engaging the other electrode of the rectifier cell, a shell of conducting material in which the cup member is disposed with the open end of the cup member seated on the bottom of the shell, retaining means for holding the cup member seated within the shell thereby biasing the resilient contact to exert some pressure on the rectifier cell electrodes, a terminal connector secured to the shell, and means for sealing the open end of said shell.

2. A rectifier assembly comprising, a cup member of insulating material having an opening in its bottom wall, a folded contact member of large heat dissipating area within the cup member, a lead-in wire secured to one end of the contact member and passing through the opening in the cup member, a rectifier cell within the cup member so disposed that an electrode thereof engages the other end of the contact member, a resilient contact in said cup member and engaging the other electrode of the rectifier cell, a shell of conducting material in which the cup member is disposed with the open end of the cup member seated on the bottom of the shell, retaining means for holding the cup member seated within the shell thereby biasing the resilient contact to exert some pressure on the rectifier cell electrodes, a terminal connector secured to the shell, and means for sealing the open end of said shell.

3. A rectifier assembly comprising, a cup member of insulating material having an opening in its bottom wall, a folded contact member of large heat dissipating area within the cup member, a lead-in wire secured to one end of the contact member and passing through the opening in the cup member; a rectifier cell within the cup member; said rectifier cell having a base and a counterelectrode, the cell being so disposed within the cup member that the counterelectrode engages the other end of the contact member, a resilient contact in said cup member and engaging the base of the rectifier cell, a shell of conducting material in which the cup member is disposed with the open end of the cup member seated on the bottom of the shell, retaining means for holding the cup member seated within the shell thereby biasing the resilient contact to exert some pressure on the base and counterelectrode of the rectifier cell, a terminal connector secured to the shell, and means for sealing the open end of said shell.

4. A rectifier assembly comprising, a cup member of insulating material having an opening in its bottom wall, a U-shaped contact member of large heat dissipating area within the cup member, a lead-in wire secured to one arm of the contact member and passing through the opening in the cup member with little clearance, a rectifier cell within the cup member having an electrode engaging the other arm of the contact member, a resilient contact washer in said cup member and engaging the other electrode of the rectifier cell, a shell of conducting material in which the cup member is disposed with the open end of the cup member seated on the bottom of the shell, retaining means provided on the open end of the shell for holding the cup member seated within the shell thereby biasing the resilient contact washer to exert some pressure on the rectifier cell electrodes, a terminal connector secured to the shell, and a moisture-resistant seal in the open end of said shell.

5. A rectifier assembly comprising, a cup member of insulating material having an opening in its bottom wall, a U-shaped contact member of large heat dissipating area within the cup member, an insulating spacer between the arms of the U-shaped contact member, a lead-in wire secured to one arm of the contact member and passing through the opening in the cup member with little clearance; a rectifier cell within the cup member, said rectifier cell having a base and a counter-electrode, the cell being so disposed within the cup member that the counterelectrode engages the other arm of the contact member; a resilient contact washer in said cup member and engaging the base of the rectifier cell, a shell of conducting material in which the cup member is disposed with the open end of the cup member seated on the bottom of the shell, retaining means provided on the open end of the shell for holding the cup member seated within the shell thereby biasing the resilient contact washer to exert some pressure on the base and counterelectrode of the rectifier cell, a terminal connector secured to the shell, and a moisture-resistant seal in the open end of said shell.

6. A rectifier assembly comprising, a cup member of insulating material having an opening in its bottom wall, a contact member of large heat dissipating area within the cup member, a lead-in wire secured to the contact member and passing through the opening in the cup member; at least two rectifier cells within the cup member, the cells being series connected, an end electrode of the series connected cells engaging the contact member; a resilient contact in said cup member and engaging the other end electrode of the series connected cells, a shell of conducting material in which the cup member is disposed with the open end of the cup member seated on the bottom of the shell, retaining means for holding the cup member seated within the shell thereby biasing the resilient contact to exert some pressure on the rectifier cell electrodes, a terminal connector secured to the shell, and means for sealing the open end of said shell.

7. A rectifier assembly comprising, a cup member of insulating material having an opening in its bottom wall, a folded contact member of large heat dissipating area within the cup member, a lead-in wire secured to one end of the contact member and passing through the opening in the cup member; at least two rectifier cells within the cup member, each of said rectifier cells having a base and a counterelectrode, the cells being so disposed within the cup member that the counterelectrode of one cell engages the base of the adjacent cell, the counterelectrode of an end cell engaging the other end of the contact member, a resilient contact of considerable area in said cup member and engaging the base of the other end cell, a shell of conducting material in which the cup member is disposed with the open end of the cup member seated on the bottom of the shell, retaining means provided on the open end of the shell for holding the cup member seated within the shell thereby biasing the resilient contact to exert some pressure on the bases and counterelectrodes of the rectifier cells, a terminal connector secured to the shell, and a moisture-resistant seal in the open end of said shell.

8. A rectifier assembly comprising, a cup member of insulating material having an opening in its bottom wall, a U-shaped contact member of large heat dissipating area within the cup member, an insulating spacer between the arms of the U-shaped contact member, a lead-in wire secured to one arm of the contact member and passing through the opening in the cup member with little clearance; at least two rectifier cells within the cup member, said rectifier cell having a base and a counterelectrode, the cells being so disposed within the cup member that the counterelectrode of one cell engages the base of the adjacent cell, the counterelectrode of an end cell engaging the other arm of the contact member, a resilient contact washer in said cup member and engaging the base of the other end cell, a shell of conducting material in which the cup member is disposed with the open end of the cup member seated on the bottom of the shell, retaining means provided on the open end of the shell for holding the cup member seated within the shell thereby biasing the resilient contact washer to exert some pressure on the bases and counterelectrodes of the rectifier cells, a terminal connector secured to the shell, and a moisture-resistant seal in the open end of said shell.

References Cited in the file of this patent

UNITED STATES PATENTS 2,522,700    Baker _____ Sept. 19, 1950

FOREIGN PATENTS 612,471    Great Britain _____ Nov. 12, 1948